United States Patent
Shivashankaraiah (10) Patent No.: US 9,571,432 B1
(45) Date of Patent: *Feb. 14, 2017

(54) MESSAGE ASSISTANT VIA SMART TEMPLATES

(71) Applicant: International Business Machines Corporation, Armonk, NY (US)

(72) Inventor: Nataraj Shivashankaraiah, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/151,993

(22) Filed: May 11, 2016

Related U.S. Application Data (63) Continuation of application No. 14/982,095, filed on Dec. 29, 2015, now Pat. No. 9,413,899, which is a continuation of application No. 14/838,544, filed on Aug. 28, 2015.

(51) Int. Cl.
*H04M 15/00* (2006.01)
*H04L 12/58* (2006.01)
*G06Q 10/10* (2012.01)

(52) U.S. Cl.
CPC ......... *H04L 51/046* (2013.01); *G06Q 10/1093* (2013.01); *H04L 51/26* (2013.01)

(58) Field of Classification Search
USPC .............. 379/111.01; 455/466; 709/204–206
See application file for complete search history.

(56) References Cited

U.S. PATENT DOCUMENTS

| | | | |
|---|---|---|---|
| 7,778,957 B2 | 8/2010 | Vuong | |
| 7,788,327 B2 | 8/2010 | Naito et al. | |
| 8,626,706 B2 | 1/2014 | Babu | |
| 2006/0265453 A1 | 11/2006 | Kaminsky et al. | |
| 2008/0077675 A1 | 3/2008 | Graef | |
| 2011/0302249 A1* | 12/2011 | Orr | G06Q 10/107 709/206 |
| 2012/0259927 A1* | 10/2012 | Lockhart | H04L 12/5845 709/206 |
| 2013/0185051 A1 | 7/2013 | Buryak et al. | |
| 2013/0212190 A1* | 8/2013 | Patil | G06F 17/276 709/206 |

(Continued)

FOREIGN PATENT DOCUMENTS

| | | |
|---|---|---|
| CN | 102611796 A | 7/2012 |
| CN | 102789317 A | 11/2012 |
| EP | 2393046 A1 | 7/2011 |

OTHER PUBLICATIONS

U.S. Appl. No. 14/838,544, filed Aug. 28, 2015, Entitled "Message Assistant Via Smart Templates".

(Continued)

*Primary Examiner* — Maria El-Zoobi
(74) *Attorney, Agent, or Firm* — Alexander G. Jochym (57) ABSTRACT

Aspects of the present invention disclose a method for sending a message. The method includes receiving a calendar of a user. The method further includes receiving an indication of a time. The method further includes determining one or more messages based on the calendar and the time. The method further includes receiving an indication from the user of selecting a message from the one or more messages.

1 Claim, 3 Drawing Sheets (56) References Cited

U.S. PATENT DOCUMENTS

2014/0004889 A1\* 1/2014 Davis ................. H04L 51/02
                                                    455/466

OTHER PUBLICATIONS

U.S. Appl. No. 14/982,095, filed Dec. 29, 2015; Entitled "Message Assistant Via Smart Templates".
List of IBM Patents or Patent Applications Treated as Related; Dated Jun. 10, 2016; 2 pages.
"Template Phrases for Microsoft Outlook: Insert text templates into Outlook email messages"; AbleBits; © 2003-2015 Add-in Express Ltd., pp. 1-3, Printed Apr. 8, 2015, <https://www.ablebits.com/outlook-templates-phrases/>.

\* cited by examiner

MESSAGE ASSISTANT VIA SMART TEMPLATES

BACKGROUND OF THE INVENTION

The present invention relates generally to the field of messaging, and more particularly to the use of "smart" templates to assist in the sending of messages.

The use of some form of messaging is prevalent in today's society. E-mail and instant messaging in an office environment are quick and efficient options for colleagues to communicate with one another. Text messaging using cell phones, smartphones, phablets, personal digital assistants (PDAs), tablet computers, and the like, is another choice when looking for a simple way to communicate with another person. A full-size keyboard is likely used to create both e-mail and instant messages while text messages, for the most part, are created with mobile devices which utilize much smaller keyboards. And in the case of an older cell phone, like a flip phone, with no standard keyboard at all.

SUMMARY

Aspects of the present invention disclose a method for sending a message. The method includes receiving a calendar of a user. The method further includes receiving an indication of a time. The method further includes determining one or more messages based on the calendar and the time. The method further includes receiving an indication from the user of selecting a message from the one or more messages.

DETAILED DESCRIPTION

Embodiments of the present invention recognize that there are instances when a quicker, simpler means of sending a message may be beneficial. An individual sending a message may be time constrained, may have trouble composing a text message using a small display and keyboard like those on a smartphone or may send a similar message to a given recipient at the same time each day.

Embodiments of the present invention recognize how prevalent sending messages has become in our society today. The rising trend of smartphone ownership will lend itself to even more frequent use of text messaging. However, the use of something other than a full-size keyboard may make text messaging (or texting) problematic for some people. Keyboard keys may be small and hard to see due to the smaller displays on mobile devices. While the small keyboard on a mobile device may be in the Q-W-E-R-T-Y format, actually typing on the keyboard is not an easy task to accomplish for many people. Also, the same message, regardless of message type, may be sent to the same recipient at the same time at a given frequency. Typing, and retyping, that same message may be time consuming and may introduce an error in the message if some portion of the message is mistyped. While sending messages using today's technologies is not complicated, a template system that offers a list of the most likely messages to be sent based on recipient, time of day, message frequency for a particular time interval, and selected calendar (e.g., a work calendar, a personal calendar, a religious calendar, a government calendar, a holiday calendar, etc.) may save time, eliminate potential errors and possibly reduce maladies associated with extended computer screen use. Once the template system determines either (a) the sender of a message to a user or (b) the recipient of a message from a user, it provides the user with a message list. The message list includes the most likely messages the user might send based on the time of day, the message frequency for a particular time interval and a calendar input by the user. A message based on the time of day may include "Good morning" for a message sent at 6:00 AM. Using the message frequency for a particular time interval criteria, a message to a work colleague in the 8:00 AM-10:00 AM time interval may include "Are you ready for the morning meeting"? And a message, based on the user's preferred calendar may include "Happy Birthday" if the user's selected calendar includes family birthdays. A message selected from the list is replaced on the list with the next most likely message a user may send. This template system is implementable with any type of messaging technology.

Figure 1:
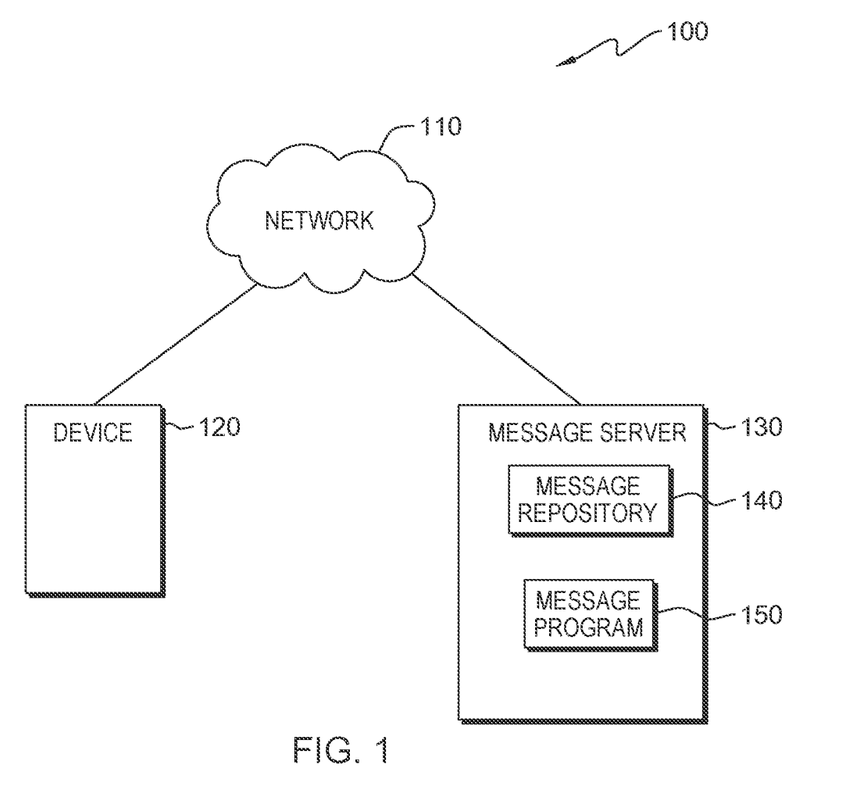
FIG. 1 is a functional block diagram of a data processing environment, in accordance with an embodiment of the present invention.

The present invention will now be described in detail with references to the Figures. FIG. 1 is a functional block diagram of a data processing environment, generally designated 100, in accordance with an embodiment of the present invention.

An embodiment of data processing environment 100 includes device 120 and message server 130, interconnected over network 110. In an example embodiment, utilizing network 110, device 120 may communicate with message server 130. In example embodiments, data processing environment 100 can include other computing devices not shown such as smartwatches, cell phones, smartphones, phablets, tablet computers, laptop computers, desktop computers, computer servers, or any other computer systems known in the art.

In example embodiments, device 120 may connect to network 110 which enables device 120 to access other computing devices and/or data not directly stored to device 120. Network 110 may be a local area network (LAN), a telecommunications network, a wide area network (WAN) such as the Internet, or any combination of the three, and include wired, wireless or fiber optic connections. In general, network 110 can be any combination of connections and protocols that will support communications between device 120 and other computing devices, in accordance with embodiments of the present invention.

According to embodiments of the present invention, device 120 may be a laptop, tablet or netbook personal computer (PC), a desktop computer, a personal digital assistant (PDA), a smartphone, or any programmable electronic device capable of communicating with any computing device within computing environment 100. In certain embodiments, device 120 represents a computer system utilizing clustered computers and components (e.g., database server computers, application server computers, etc.) that act as a single pool of seamless resources when accessed by elements of computing environment 100 (e.g., message server 130). Device 120 allows a user to communicate messages from device 120 to any other device (not shown) connected to network 110. Device 120 may include programs that allow for the communication of messages (i.e., text messages, e-mail messages, etc.). In general, device 120 is representative of any electronic device or combination of electronic devices capable of executing computer readable program instructions. Message server 130 is substantially similar to device 120 and has substantially similar components. Device 120 may include components as depicted and described in further detail with respect to FIG. 3, in accordance with embodiments of the present invention.

Message server 130 includes message repository 140 and message program 150. In various embodiments of the present invention, message server 130 may store messages, either sent or received, from device 120, to message repository 140, via message program 150.

Message repository 140 may be storage that may be written to and/or read by message program 150. In one embodiment, message repository 140 resides on message server 130. In other embodiments, message repository 140 may reside on device 120, in cloud storage or on another computing device accessible by message program 150 via network 110. In yet another embodiment, message repository 140 may represent multiple storage devices within message server 130. In various embodiments, message repository 140 may be implemented as a database, a collection of files, a knowledge base, an expert system, etc., residing on a database server, a hard disk drive, flash memory, and the like. In an example embodiment, messages sent or received by device 120 may be stored to message repository 140. For example, message repository 140 may include a text message and associated message metadata (e.g., time stamp, recipient, location, etc.) that was sent from a smartphone.

Message program 150 may be a program, subprogram of a larger program, application, or plurality of applications, that functions to catalogue messages by attributes and to suggest messages to a user of a messaging device. The attributes may include: the actual message content; message sender; message recipient; frequency of utilizing the same message; time of day of the message; time interval in the day of the message; and the date of the message as it relates to any preferred calendar. In one embodiment, message program 150 continuously monitors the messages a user sends from device 120, stores the messages to message repository 140 and captures the above attributes for each message. This data enables message program 150 to create a list of messages for each contact of the user that the user exchanges messages with. The message list is a list of suggested messages to send to a contact based on the attributes of previously sent messages. The data also allows message program 150 to maintain the message list by ranking messages based on frequency of use. This process is essentially a count of the number of times a given message is sent. The more often a message is sent by a user, the higher in rank it is compared to other messages and the more likely it will appear in the suggested message list. Once a message is sent from the list, message program 150 removes that message from the list and replaces it, based on the ranking, with the next most likely message to be sent by the user. The message list for a given contact (meaning that contact A may have a different message list than contact B) will vary based on the date and time of day a message is sent. For example, "Good morning." may be in the message list at 7:00 AM while it would not be in the message list at 4:00 PM. In another example, a message list for the user's spouse on the spouse's birthday may include "Happy Birthday!" while a message list for the spouse on any other day would not include that message. In various embodiments of the present invention, message program 150 may reside on device 120, on message server 130, on another computing device connected to network 110 or in cloud storage accessible over network 110. Message program 150 may also include various calendars such as a work calendar, a personal calendar, a religious calendar, a government calendar, a holiday calendar, and the like, in accordance with embodiments of the present invention. In other embodiments, message program 150 may interact with other calendar programs, known in the art.

In another embodiment, message program 150 will determine the current time when a user begins to create a message. For example, message program 150 determines it is between 10:00 AM and 10:30 AM when the user begins to create a message to send to 'Bob'. Message program 150 will then determine if the user previously messaged the same contact in the same time frame. If the user has not messaged the same contact in the same time frame, message program 150 will increase the time frame by thirty minutes to 10:30 AM to 11:00 AM attempting to determine if there were previous messages sent to 'Bob' in the new time frame. If previous messages are not found, this process will continue until message program reaches the starting time frame (10:00 AM-10:30 AM) twenty-four hours later. If messages to 'Bob' are not found in the twenty-four hour window, message program 150 will provide three messages based on the time of day and two messages based on the user's calendar to select from for the user's message to 'Bob'.

However, if message program 150 does determine messages were previously sent to 'Bob' in a given time frame, message program 150 will provide the most used messages as the first three messages in the message list. The specific order of these first three messages is based on how closely the previous time frame of the message corresponds with the current time frame. For example, the first message may be from the same time frame, the second message from a time frame offset by thirty minutes and the third message from a time frame offset by two hours. In this example, the fourth message would be based on the time of day and the fifth based on the user's calendar.

According to embodiments of the present invention, message program 150 creates a list of five messages from which a user may choose a message to send to a recipient. In an alternate embodiment, message program 150 may create a list of any number of messages. In another embodiment, the user also has the option to send a message to a recipient that is not in the suggested list of messages. The message list may include messages from each of three categories: time of day, frequency of a message sent to a contact during a particular time interval on a given day and the user's preferred calendar. In an example, the message list may contain one message from the time of day category, three messages from the frequency of a message sent to a contact during a particular time interval on a given day category and one message from the calendar category. Once a message is selected from the suggested list of messages and sent to a recipient, message program 150 updates the message list by removing the sent message and replacing it with a new suggested message.

In various embodiments of the present invention, the user may customize features of message program 150. In one embodiment, a user may choose to only apply message program 150 to a certain number of the user's contacts (e.g., five, ten, twenty, etc.) while in another embodiment, the user may choose to apply message program 150 to the user's entire contact list. In yet another embodiment, the user may choose to incorporate a personal calendar, rather than a religious or holiday calendar, for important dates such as birthdays, anniversaries and the like. In yet another embodiment, the user may choose a memory allocation for each contact; e.g., one megabyte allocated for a contact the user infrequently sends messages and three megabytes allocated for a contact the user frequently sends messages. This allows a user to customize message program 150 based on the available memory included in the device of the user (i.e., device 120) which is capable of sending and receiving messages.

Figure 2:
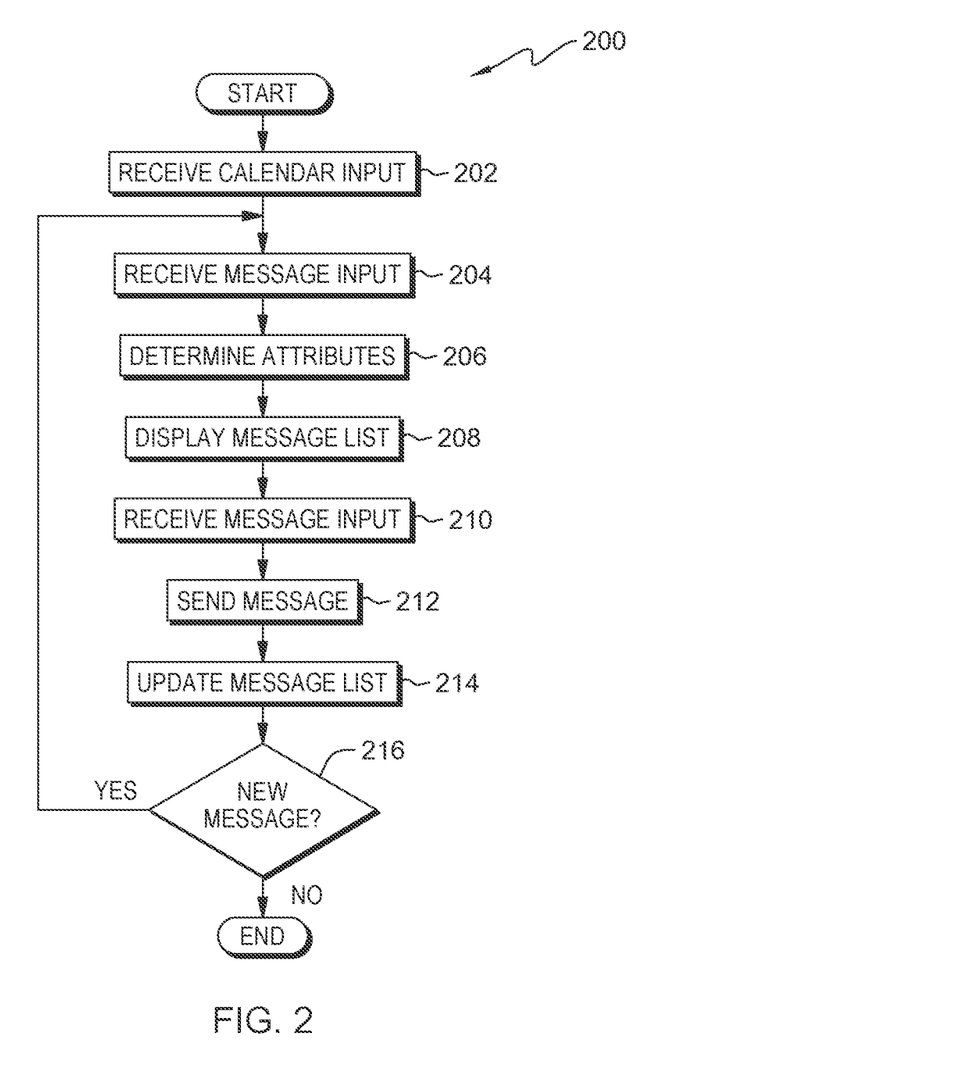
FIG. 2 is a flowchart depicting operational steps of a text message application that functions to provide a user with the most likely messages to be sent to a particular recipient based on the time of day, the frequency of a message sent to a contact during a particular interval of time on a given day and the preferred calendar of a user, in accordance with an embodiment of the present invention.

FIG. 2 is a flowchart depicting operational steps 200 of message program 150, a program, subprogram of a larger program, application, or plurality of applications, that functions to catalogue messages by attributes and to suggest messages to a user of a messaging device. Message program 150 allows a user to choose a message to send to a recipient based on the particular recipient, the time of day, the frequency of a message sent to a contact during a particular time interval on a given day, and the user's preferred calendar. In one embodiment, the user is sending a message to a new recipient. Message program 150 initiates and provides a message list based only on the user's calendar since there are no previous messages to the recipient. In another embodiment, a user sends a message to a contact with whom the user has a previous relationship. In an example, the user is sending a message to the user's spouse who have messaged one another many times; in this example, message program 150 initiates and displays a list of suggested messages for the user to send to the spouse based on time of day, message frequency for a particular time interval, and the preferred calendar of the user. In another embodiment, the user has chosen to apply message program 150 to a specific number of contacts in the user's contact list. In an example, the user has chosen to apply message program 150 to the top five contacts, based on message frequency, in the contact list of the user. In an example, the user intends to send a text message from his smartphone to a work colleague who is also the user's best friend. Due to this close relationship, the best friend is in the top five of the user's contact list; consequently, the user views a message list, displayed by message program 150, of the most likely text messages (for this particular recipient) as shown above and the user selects one of the messages. In another example, the user intends to send an instant message from his desktop computer to a work acquaintance; because the acquaintance is not in the top five on the user's contact list, the user is not provided a message list. In yet another example, the user ignores the provided list and creates a completely unique text message for the user's best friend. In another embodiment, the user has chosen to apply message program 150 to the user's entire contact list. For example, regardless of which contact the user selects to send a message to, message program 150 will provide a suggested list of messages.

Message program 150 receives calendar input (step 202). In other words, message program 150 receives input from a user of an electronic device, such as device 120, regarding the preferred calendar of the user. In one embodiment, this may be a one-time setup step for the electronic device and the user always uses the same calendar. In another embodiment, a user selects a preferred calendar each time the user opens the included messaging application (not shown) on the electronic device of the user, enabling the user to choose a new calendar for each messaging session. In an embodiment of the present invention, message program 150 receives an indication from the user regarding the preferred calendar of the user which is stored in message repository 140. In one example, the user selects the U.S. National Holiday calendar. In another example, the user selects the user's personal calendar, where the user stores personal important dates such as birthdays and anniversaries.

Message program 150 receives message input (step 204). In other words, message program 150 receives input corresponding to either an incoming or an outgoing message. In one embodiment, a user of device 120 receives an indication of an incoming message from message server 130. For example, a user of a smartphone receives a text message from the spouse of the user. In another embodiment, the user of device 120 selects a message recipient from the contact list of the user to send a message to. For example, the smartphone user selects the spouse of the user from the contact list of the user.

Message program 150 determines attributes (step 206). In other words, message program 150 determines the current attributes at the particular time message program 150 receives the message input in step 204. In accordance with an embodiment of the present invention, message program 150 receives input of a user from device 120 of the current time of day, a time interval (i.e., a block of time), as well as any important events in a preferred calendar of a user. In various embodiments of the present invention, a time interval may be a one hour interval (e.g., 8:00 AM-9:00 AM), a two hour interval (1:00 PM-3:00 PM) or any interval as defined by the user. In an example, a user receives an indication on the device of the user that it is 12:00 PM on the birthday of the sister-in-law of the user. In another example, when a user opens an instant message program on the work computer of the user in order to send an instant message to the spouse of the user, the user receives an indication that it is Valentine's Day in the United States.

Message program 150 displays a message list (step 208). In other words, message program 150 displays a message list on device 120 based on the determined attributes in step 206. According to various embodiments of the present invention, message program 150 may display a list of messages, stored in message repository 140, based on the current time of day, the frequency of a message sent to a contact during a particular time interval on a given day and the current date and any associated events noted on a user's preferred calendar. In an example, a smartphone user, preparing to send a text message at 6:00 AM to a work colleague, may see a message list which includes these messages: (1) "Good morning."; (2) "Want to grab breakfast?"; (3) "Do you need a ride?"; (4) "Is the lunch meeting on?"; and (5) "Don't forget Valentine's Day!". The message content may vary based on the date, time of day and the recipient. For example, at 1:00 PM the list may include "Good afternoon." in place of "Good morning.". Or if the recipient is the spouse of the user rather than work colleague, the list may include "Please pick up milk on the way home?" in place of "Do you need a ride?". One or more of the messages in the list may vary based on the date, time of day, or the recipient, in accordance with embodiments of the present invention. In an embodiment of the present invention, a user may request a new list of messages from which to select a message, rather than selecting a message from the initial suggested list of messages.

In another example, a smartphone user, preparing to send a text message on Christmas morning to the parents of the user, may see a message list which includes these messages: (1) "Merry Christmas!"; (2) "Was Santa Claus good to you?"; (3) "Good morning."; (4) How are you feeling?"; and (5) "Grandkids were up before dawn! Now we get ready for New Year's Eve.". The messages may vary based on the user's preferred calendar. For example, on Halloween the list may include "Boo!" in place of "Merry Christmas!". One or more of the messages in the list may vary based on user's preferred calendar, in accordance with embodiments of the present invention.

Message program 150 receives message input (step 210). In other words, message program 150 receives an indication of the actual message a user intends to send. In an embodiment of the present invention, a user selects a message from the provided message list on device 120 via message program 150. For example, the user selects the second message displayed on device 120 as the message to be sent.

Message program 150 sends a message (step 212). In accordance with an embodiment of the present invention, message program 150 receives an indication from device 120 to send the message created or selected by a user of device 120. In one example, the user created the instant message "Thank you" and sends it to a work acquaintance via the user's desktop computer. In another example, the user selects the text message "Do you need a ride?" from the provided message list and sends it to the user's best friend via the user's smartphone. In yet another example, the user, ignoring the provided message list, creates the text message "Can I borrow your miter saw?" and sends it to the user's best friend via the user's smartphone.

Message program 150 updates the message list (step 214). In other words, message program 150 identifies the message a user selected from the provided message list, removes that message from the list and replaces it with the next most likely message the user would send to the same recipient based on the time of day, the frequency of a message sent to a contact during a particular time interval on a given day or an event on the user's preferred calendar. In an embodiment of the present invention, message repository 140 receives input from message program 150 to remove the sent message and to replace it with the next message in a queue based on the recipient, the time of day, the frequency of a message sent to a contact during a particular time interval on a given day, or calendar attribute. In an example, the message list shown above may be updated to include: (1) "Good morning."; (2) "Want to grab breakfast?"; (3) "Did you see the game?"; (4) "Is the lunch meeting on?"; and (5) "Don't forget Valentine's Day!". The new message "Did you see the game?" replaces the sent message "Do you need a ride?". In various embodiments, the message list may reset to the original message list after 6 hours have elapsed, after 12 hours have elapsed, or at some other pre-defined time period or occurrence. In another embodiment, the message list may change after midnight since a new date arrived. In yet another embodiment, message program 150 will also maintain the message list based on the frequency that the user sends a specific message. The most sent message will rank number one, the second most sent will rank number two, etc. and the ranking will be updated with every message sent.

Message program 150 determines whether to send a new message or if a new message has been received (decision step 216). In other words, message program 150 receives input from a user that the user intends to send a new message or receives input from message server 130 that a new message has been received on device 120. In one embodiment (decision step 216, YES branch), a user intends to send a new message or receives a new message; therefore, message program 150 proceeds to step 204. In another embodiment (decision step 216, NO branch), a user decides not to send a new message or does not receive a new message; therefore, message program 150 ends.

Figure 3:
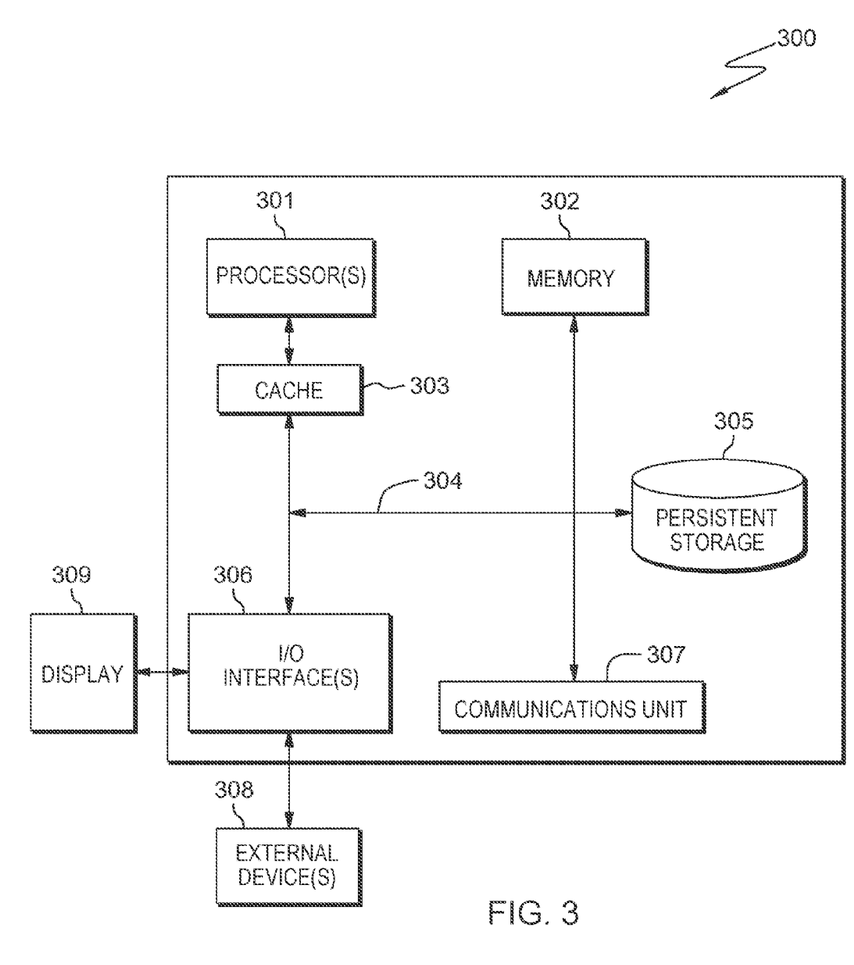
FIG. 3 depicts a block diagram of the components of a computing system representative of the electronic device and server of FIG. 1, in accordance with an embodiment of the present invention.

FIG. 3 depicts computer system 300 which is an example of a system that includes device 120 and message server 130. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for sending a message, the computer program product comprising:
  one or more computer readable non-transitory storage media; and
  program instructions stored on the one or more computer readable non-transitory storage media, the program instructions comprising:
    program instructions to receive an indication that a user is creating a message;
    program instructions to receive an indication of a time, wherein the time is a current time and a time interval, wherein the current time is the time the user begins to create the message and wherein the time interval is a block of time during a twenty-four hour day determined by the user;
    program instructions to determine a date, wherein the date is the date of the current time;
    program instructions to receive a calendar of the user, wherein the calendar of the user is a work calendar associated with the user and a personal calendar associated with the user;
    program instruction to determine one or more events for the date on the calendar of the user;
    program instructions to determine one or more messages, based on the current time and the time interval and the determined one or more events for the date on the calendar of the user;
    program instructions to display the one or more messages in a list by priority, wherein the priority is based first on the time, second on a frequency of use of a message in a time interval, and third on the calendar of the user;
    program instructions to receive an indication, from the user, selecting a message of the one or more messages;
    program instructions to transmit the indicated message, wherein the indicated message is transmitted to a second user in response to the user receiving a message from the second user;
    program instructions to remove the transmitted message from the one or more messages; and
    program instructions to replace the transmitted message of the one or more messages, with a new message, wherein the new message is based on the current time and the time interval and the determined one or more events for the date on the calendar of the user.

* * * * *